US011663324B2

(12) United States Patent
Penfold et al.

(10) Patent No.: US 11,663,324 B2
(45) Date of Patent: May 30, 2023

(54) OBTAINING INFORMATION FOR SECURITY CONFIGURATION

(71) Applicant: INTERNATIONAL BUSINESS MACHINES CORPORATION, Armonk, NY (US)

(72) Inventors: Colin R. Penfold, Ropley (GB); Darren R. Beard, Chandlers Ford (GB); David Michael Key, Hampshire (GB); Andrew David Clifton, Swanmore (GB)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 17/398,102

(22) Filed: Aug. 10, 2021

(65) Prior Publication Data
US 2023/0051461 A1    Feb. 16, 2023

(51) Int. Cl.
*G06F 21/54* (2013.01)
(52) U.S. Cl.
CPC ........ *G06F 21/54* (2013.01); *G06F 2221/033* (2013.01)
(58) Field of Classification Search
CPC ..... H04L 63/1425; G06F 21/54; G06F 21/55; G06F 21/566; G06F 2221/033
See application file for complete search history.

(56) References Cited

U.S. PATENT DOCUMENTS

| | | | |
|---|---|---|---|
| 7,818,788 B2 | 10/2010 | Meier | |
| 10,061,922 B2 * | 8/2018 | Altman | ............... H04L 63/1425 |
| 10,601,871 B2 | 3/2020 | Hosie | |
| 2007/0199050 A1 | 8/2007 | Meier | |
| 2018/0205759 A1 | 7/2018 | Hosie | |
| 2020/0153855 A1 | 5/2020 | Kirti | |
| 2020/0175152 A1 * | 6/2020 | Xu | .......................... G06F 21/56 |
| 2021/0019142 A1 | 1/2021 | Bhagwan | |

OTHER PUBLICATIONS

Disclosed Anonymously, "OWASP Application Security Verification Standard", Feb. 25, 2021, 5 Pages. https://owasp.org/www-project-application-security-verification-standard/.
Disclosed Anonymously, "URI Based Entry Points", Part of Cisco, Feb. 25, 2021, 5 Pages. https://docs.appdynamics.com/display/PRO21/URI+Based+Entry+Points.
Cobb, "Best practices for audit, log review for IT security investigations", ComputerWeekly.com, Aug. 8, 2011, 5 Pages. https://www.computerweekly.com/tip/Best-practices-for-audit-log-review-for-IT-security-investigations.
Disclosed Anonymously, "Defining Security Requirements for Web Applications—The Java EE 5 Tutorial", Feb. 25, 2021, 13 Pages. https://docs.oracle.com/javaee/5/tutorial/doc/bncbe.html.

* cited by examiner

*Primary Examiner* — Paul E Callahan
(74) *Attorney, Agent, or Firm* — Robert R. Aragona

(57) ABSTRACT

Concepts for acquiring information for identifying a security configuration for an application are proposed. In particular, the information is obtained by running the application in a development environment, detecting security requests made on behalf of the application, and then storing security information associated with the security requests in a security log. Using this concept, a security log may be obtained from which an appropriate security configuration may be determined.

13 Claims, 9 Drawing Sheets

OBTAINING INFORMATION FOR SECURITY CONFIGURATION

BACKGROUND

The present invention relates generally to obtaining security information, and more particularly to acquiring information for identifying a security configuration.

Security for data privacy and content protection is becoming increasingly important to application development. However, adequate security is also very difficult to integrate in the field of software development and IT operations (DevOps).

Typically, applications are developed or updated in an environment with few security provisions, and therefore minimal security. Such applications are then propagated through a test environment, a quality assurance (QA) environment, and into a production environment. It is essential that appropriate security configurations and/or definitions for the application are provided for each environment.

However, identification of appropriate security configurations is often problematic. One reason for this is that security teams and application teams usually have competing aims. In addition, security requirements for the various environments in which the application will be run (development, test, QA, production) typically vary. Thus, identifying appropriate security definitions for an application is an extremely time consuming and expensive process. Moreover, compromises are usually made to ensure that access is not lost, which is usually achieved by reducing the level of security. This reduction in security provisions may be detrimental to ensuring data privacy and content protection.

SUMMARY

The present invention seeks to provide a computer-implemented method of acquiring information for identifying a security configuration for an application.

The present invention further seeks to provide a computer program comprising computer program code means which is configured to, when said computer program is run on a computer, implement a method of acquiring information for identifying a security configuration for an application.

The present invention also seeks to provide a system for acquiring information for identifying a security configuration for an application.

According to an aspect of the present invention, there is provided a computer-implemented method of acquiring information for identifying a security configuration for an application. The method comprises executing an application in a development environment, detecting security requests made on behalf of the application, and storing security request information describing the detected security requests in a security log.

According to another aspect of the invention, there is provided a computer program comprising computer program code means which is configured to, when said computer program is run on a computer, implement a method of acquiring information for identifying a security configuration for an application. The method comprises executing an application in a development environment, detecting security requests made on behalf of the application, and storing security request information describing the detected security requests in a security log.

According to yet another aspect of the invention, there is provided a system for acquiring information for identifying a security configuration for an application. The system comprises an execution component configured to execute an application in a development environment, a detection component configured to detect security requests made on behalf of the application, and a data storage component configured to store security request information describing the detected security requests in a security log.

Concepts are proposed for obtaining information in the form of a security log, which may be suitable for identification of a security configuration for an application. Current methods are either time consuming and expensive, or are error prone and inaccurate.

In particular, it is proposed that running an application in its development environment (which will likely have minimal security enabled) may enable all security requests made on behalf of the application to be captured. When stored in the form of a security log, a security team may review the log to identify a suitable security configuration for the application, or a number of security configurations for different application environments.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION

Figure 1:
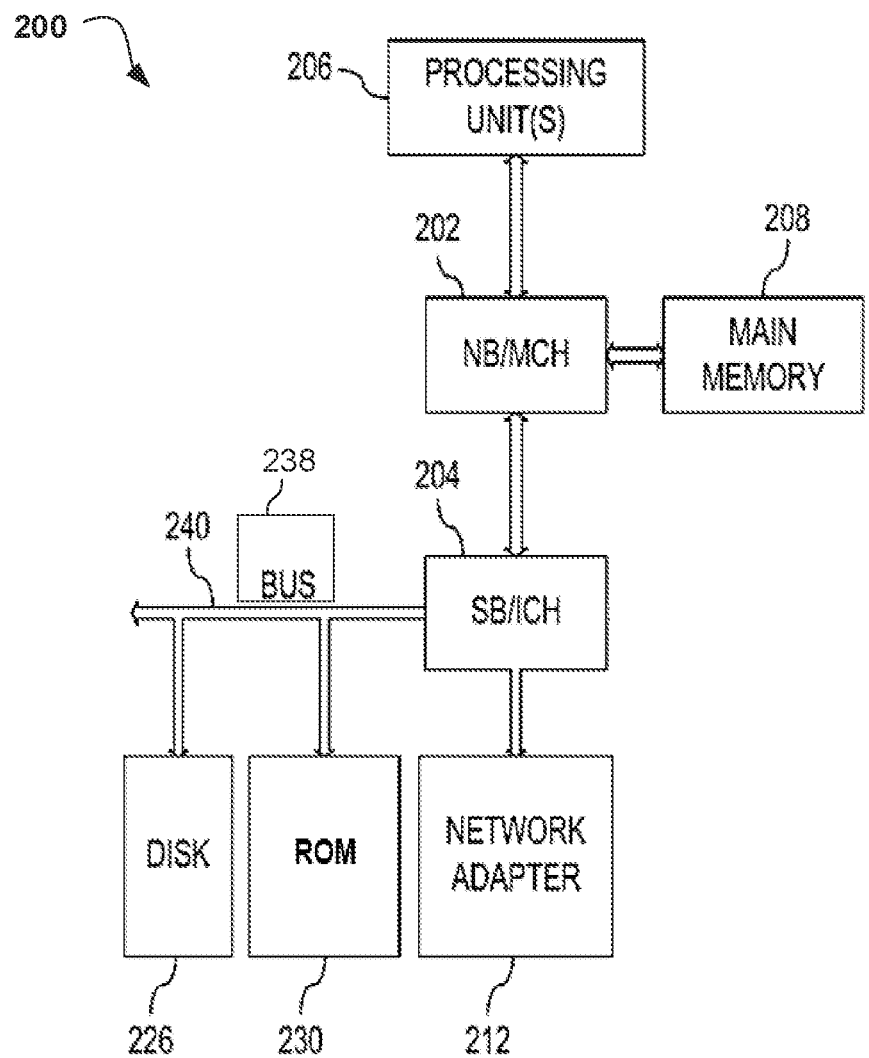
FIG. 1 is a block diagram of an example system in which aspects of the illustrative embodiments may be implemented.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet, and so on to cooperatively execute at least one embodiment of the methods of the present invention.

Implementations in accordance with the present disclosure relate to various techniques, methods, schemes and/or solutions pertaining to the acquisition of information for identifying a security configuration for an application. In particular, it is proposed to store security request information describing security requests made on behalf of the application (during execution of the application in a development environment) in a security log. Put another way, during execution of an application in a development environment, security information is stored in a security log, which may be used for subsequent determination of a security configuration for the application.

Embodiments of the proposed invention provide a security log containing information suitable for identifying a security configuration for an application. The information is obtained by running the application in a development environment, detecting security requests made on behalf of the application, and then storing security information associated with the security requests in the security log. Accordingly, information for producing security configurations is stored, and may be subsequently used to produce security configurations, or presented in a way that a security team can determine appropriate security configurations.

Accordingly, by acquiring a security log, security configurations may be obtained in a way that avoids time consuming, expensive, and error prone techniques. This method may be used to acquire more information than security manager-based error messages, and therefore a more appropriate security configuration may be determined.

In other words, embodiments of the present invention are based on the realization that by running the application in a development environment, and subsequently detecting and storing security request information in a security log, an appropriate and robust security configuration may be identified.

Further, it should be understood that security requests made on behalf of the application may include security requests made by the application itself, or by auxiliary applications. In this way, all information may be captured such that a complete set of security requests made by an application can be stored in a log for subsequent use to identify a security configuration.

By way of explanation, security is critical in application development. However, aims of a security team and a development team may be contradictory, which often leads to compromises that reduce the level for security for the sake of access. Clearly, this approach can lead to serious consequences due to breaches of data privacy and content protection. Indeed, it is also often difficult, if not impossible to achieve an appropriate security configuration in one iteration.

Currently, solutions to these problems are inadequate. Such solutions include:

(i) Reviewing the application code as part of the software development and IT operations (DevOps) process, in order to identify code, which requires security configuration. Unfortunately, this requires highly skilled engineers to identify such code, is expensive, and requires a large amount of time.

(ii) Performing trial and error in a testing environment, resulting in the identification of security definitions. This technique is both time consuming, and typically results in a large number of errors. Further, it generally leads to code being "accessed by default" rather than the best practice of "secured by default", meaning that the resulting application may be insecure.

(iii) Logging all warning messages as the application is executed, and then implementing a security configuration based on the warning messages. This requires the security manager to support a warning mode. However, this may lead to significant problems unless the server on which the application is being executed, and the security manager, is completely isolated from any production data. Also, information acquired is often incomplete because many requests are not routed via the security manager. Indeed, the requests that are sent to the security manager will depend on the configuration.

Thus, it is clear that an alternative solution is required to overcome the issues of current solutions. Accordingly, the proposed concepts are based on the realization that by implementation of a security log configured to store security request information, many of the above problems may be overcome.

By way of example, some embodiments of the proposed invention may be implemented in a transaction server (IBM® CICS®, for example) (IBM and all IBM-based trademarks and logos are trademarks or registered trademarks of International Business Machines Corporation and/or its affiliates). In such a case, the invention may contain the following features:

(i) The test server, on which the application is executed, may require authentication but not authorization;

(ii) A command may be used to specify which entry points or user types (representing roles used by the application) detection of associated security requests should be run on. An entry point may, for example, be a transaction, or a uniform resource identifier (URI);

(iii) Storage for an inline security log of events may be obtained. In such a case, a header of a log of events may be populated with the user identifier, the entry point, time stamp, server identifier, and/or unit of work. Indeed, if such events include transactions between multiple servers, a correlator to link together a multi-server request may be stored;

(iv) A hook may be inserted into any code that issues security requests. The hook may be used to detect and record security requests and security responses associated with the code. A record may be added to the security log for the detected and recorded security requests and security responses;

(v) When a request links to another server, information is sent with the request so that that server also logs the request to its own log;

(vi) At the end of execution of the application, the security log(s) may be written to a common security log, which is shared by all servers;

(vii) A post-processing job may be performed, which sorts the security logs from the server(s), such that the security requests can be aggregated, and duplicates may be removed; and (viii) The final security log may indicate which user(s) require which level of access to which resources, and from which servers.

In this case, if the whole application is executed, it may be possible to accumulate and utilize the final security log, such that the required access for user types for the whole application may be determined. Also, by saving the security logs, and comparing the current security logs with historical (previous) security logs, it may be possible to create a delta of changes of the security configuration of the application required.

In some embodiments of the invention, the development environment is configured to execute the application with fewer security provisions compared to an operating environment for routine execution of applications.

By detecting security requests while the application is executed in an environment with minimal security provisions, a full understanding of the security requirements of the application may be obtained. As a result, a more appropriate security configuration may be determined based on the generated security log.

In some embodiments, the security request information comprises a security request identifier, and one or more of a time stamp, a server identifier, an entry point identifier, and a user identifier.

In the case that the security log contains a security request identifier, this would enable a security team that is subsequently reviewing the security log to more accurately ascertain a security configuration. Further information, such as a time stamp, server ID, entry point ID and user ID may be useful for producing a security configuration with improved granularity. For example, it may be determined that users identified with some user identifiers require more or less authentication, or that a certain access point requires additional security provisions.

In some embodiments, the method further comprises storing security response information corresponding to the detected security requests in the security log, wherein security response information comprises a security response identifier, and one or more of a time stamp, a server identifier, an entry point identifier, and a user identifier.

In this way, additional security information may be obtained that is related to the security requests, which may prove useful in determining an increasingly robust security configuration.

In some embodiments, the method further comprises obtaining one or more user identifiers of interest. In this case, detecting security requests comprises detecting security requests related to the one or more user identifiers of interest.

Often, it may be desirable to produce a security log that tracks the security requests and associated responses for specific user identifiers. Accordingly, a security configuration may be determined from the security log which is more appropriate for an individual security identifier. Also, by providing a security log related to a select number of user identifiers, a security configuration appropriate for such user identifiers may be more quickly determined than from a log including all security request information.

In some embodiments, the method further comprises obtaining one or more entry point identifiers of interest. In this case, detecting security requests comprises detecting security requests related to the one or more entry point identifiers of interest.

Similar to the case where detected security requests relate to user identifiers of interest, it may be desirable to detect and store security request information associated with entry point identifiers. Accordingly, a security configuration may be determined from the security log that is more appropriate for an entry point of interest. In addition, by providing a security log related to a select number of entry points, a security configuration appropriate for such entry points may be more quickly determined than from a log including all security request information.

In some embodiments, the method further comprises a preceding step of allocating storage for the security log.

Thus, storage for the security log may be allocated and secured such that all corresponding information may be stored without any loss of data.

In some embodiments, the method further comprises determining a security configuration for the application based on the security request information stored in the security log.

Indeed, it may be useful in some cases to integrate the determination of a security configuration from the security log within the method. Automatic determination of the security configuration may improve speed, accuracy, and security of the security configuration.

In some embodiments, determining the security configuration for the application comprises determining security configurations for the application based on the security request information stored in the security log for each of a plurality of application environments, wherein the plurality of application environments include a development environment, a test environment, a quality assurance environment, and a production environment.

Commonly, it is desirable to have a different security configuration for an application in different environments. For example, it is likely that it is desirable to have more security provisions for an application executed in a production environment, than in a test environment.

In other words, having different security configurations for different application execution environments means that a more secure and robust security configuration in the corresponding environments may be obtained.

In some embodiments, the method further comprises obtaining a historical security log comprising security request information describing previously detected security requests, determining a difference between the security log and the historical security log, and determining a change in the security configuration of the application based on the determined difference.

One method of determining a security configuration for an application may be to compare a security log with a historical security log. This may prove particularly advantageous when there are changes and/or updates made to an application, and the impact that this should have on the security configuration of an application may be assessed. This may reduce the time taken to determine a security configuration for an application, as the new security configuration may be built based on a previously produced security configuration.

In some embodiments, the method further comprises determining a level of access for each type of user of the application based on the security log.

Indeed, it is often the case that security of an application is most dependent on a level of access for different types of users. For example, an admin should have a high level of access, whereas a guest user, or an external user, should have a low level of access.

In some embodiments, the application is executed on a first server having a first security log which stores security request information describing detected security requests executed on the first server, and when a security request links to a second server different from the first server, the application is executed on a second server having a second security log which stores security request information describing detected security requests performed on the second server.

Frequently, applications are run across more than one server. In such a case, it may prove desirable for each server individually to store security logs. A post-processing job may be run to aggregate such security logs, or it may be desirable to keep these logs separate for individual security configuration definitions.

In some embodiments, the method further comprises compiling a final security log based on the first security log and the second security log.

Turning now to FIG. 1, there is presented a block diagram of an example system 200 in which aspects of the illustrative embodiments may be implemented. The system 200 is an example of a computer, such as client in a distributed processing system, in which computer usable code or instructions implementing the processes for illustrative embodiments of the present invention may be located. For instance, the system 200 may be configured to implement an execution component, a detection component, and a data storage component according to an embodiment.

The system 200 may be, for example, an IBM® eServer™ System P® (IBM eServer System p and all IBM eServer System p-based trademarks and logos are trademarks or registered trademarks of International Business Machines Corporation and/or its affiliates) computer system, running the Advanced Interactive Executive (AIX®) (AIX and all AIX-based trademarks and logos are trademarks or registered trademarks of International Business Machines Corporation and/or its affiliates) or the LINUX® (LINUX and all LINUX-based trademarks and logos are trademarks or registered trademarks of Linus Torvalds) operating system. The system 200 may be an application server. The system 200 may be a symmetric multiprocessor (SMP) system including a plurality of processors in processing unit 206. Alternatively, a single processor system may be employed.

In the depicted example, the system 200 employs a hub architecture including a north bridge and memory controller hub (NB/MCH) 202 and a south bridge and input/output (I/O) controller hub (SB/ICH) 204. A processing unit 206, and a main memory 208 are connected to NB/MCH 202.

In the depicted example, a local area network (LAN) adapter 212 connects to SB/ICH 204. A read only memory (ROM) 230, and a hard disk drive (HDD) 226 connect to the SB/ICH 204 through bus 238. The HDD 226 may use, for example, an integrated drive electronics (IDE) or a serial advanced technology attachment (SATA) interface.

An operating system runs on the processing unit 206. The operating system coordinates and provides control of various components within the system 200 in FIG. 2. As a client, the operating system may be a commercially available operating system. An object-oriented programming system, such as the Java™ (Java and all Java-based trademarks and logos are trademarks or registered trademarks of Oracle America, Inc. and/or its affiliates) programming system, may run in conjunction with the operating system and provides calls to the operating system from Java™ programs or applications executing on system 200.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 230, or in one or more peripheral devices.

A bus system, such as bus 238 as shown in FIG. 1, may comprise one or more buses. Of course, the bus system may be implemented using any type of communication fabric or architecture that provides for a transfer of data between different components or devices attached to the fabric or architecture. A communication unit, such as the network adapter 212 of FIG. 1, may include one or more devices used to transmit and receive data. A memory may be, for example, main memory 208, ROM 230, or a cache such as found in NB/MCH 202 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 2:
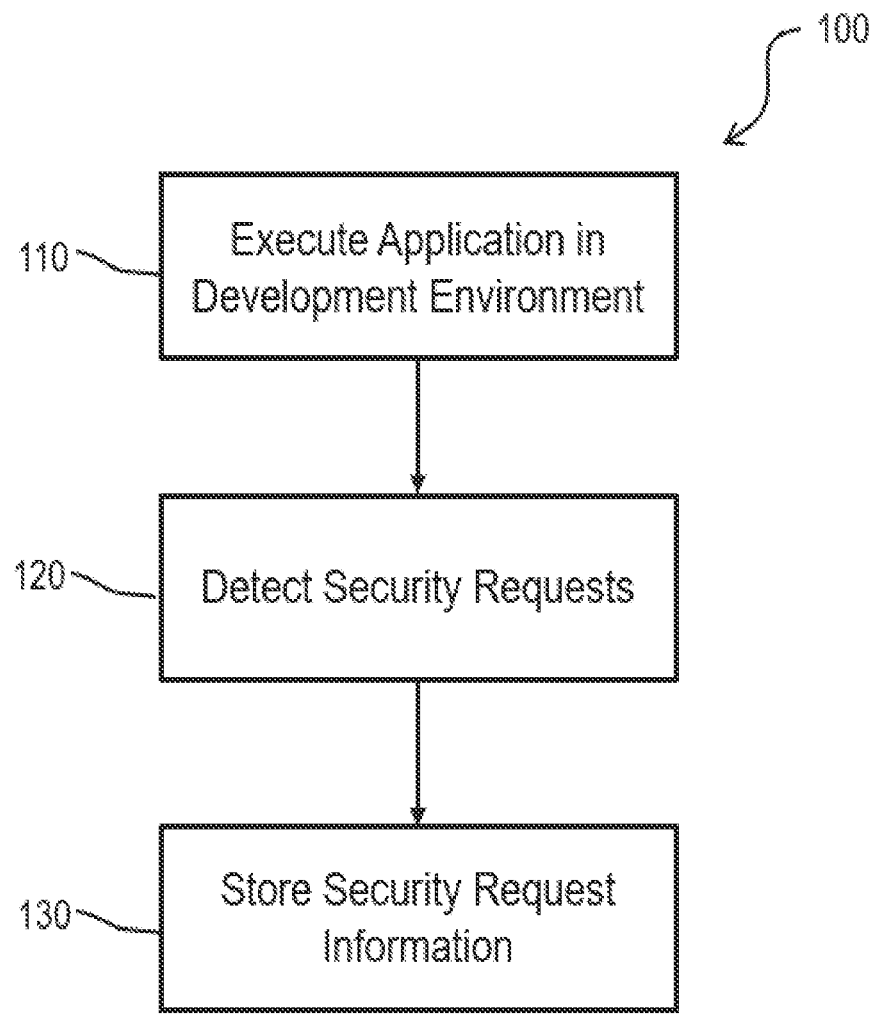
FIG. 2 is a flow diagram of a method of acquiring information for identifying a security configuration for an application according to an exemplary embodiment.

Referring now to FIG. 2, there is presented a flow diagram 100 of a method of acquiring information for identifying a security configuration for an application according to an exemplary embodiment.

At step 110, the application is executed in a development environment. The whole of the application may be executed, or only individual tasks of the application. In many cases, the development environment will have minimal security enabled. The application may be executed on one server, or the application may be executed on multiple servers. More specifically, the application may be run on a single application server, or multiple connected application servers.

In some embodiments, the development environment is configured to execute the application with fewer security provisions compared to an operating environment for routine execution of applications. In other words, the development environment will have minimal security enabled. By detecting security requests while the application is executed in an environment with minimal security provisions, a full understanding of the security requirements of the application may be obtained. As a result, a more appropriate and robust security configuration may be determined on the security log.

At step 120, security requests made on behalf of the application are detected. Detected security requests may be made by the application, or by other applications associated with the application, on behalf of the application. It may be the case that an application server on which the application is run is configured to capture all security requests made on behalf of the application. In some embodiments, hooks may be inserted into code of the application corresponding to the security requests, such that the security requests may be detected. The security requests may be detected prior to them being passed to a security component.

At step 130, security request information describing the detected security requests is stored in a security log. In some embodiments, the security request information comprises a security request identifier, and one or more of a time stamp, a server identifier, an entry point identifier, and a user identifier.

In the case that the security log contains a security request identifier, a security configuration that is more accurate may be obtained, as each security request may be identified. Indeed, additional information, such as a time stamp, server ID, entry point ID and user ID may be useful for producing an appropriate security configuration. By way of example, it may be determined that users require more or less authentication, or that a certain access point requires additional security provisions.

In some embodiments, as briefly mentioned above, the application may be executed on a first server having a first security log which stores security request information describing detected security requests executed on the first server. The application may then have a security request which links to a second server different from the first server. The second server may have a second security log which stores security request information describing detected security requests performed on the second server.

In the above case, in some embodiments a final security log may be compiled based on the first security log and the second security log. Alternatively, each security log may be stored in a common repository, and may be a merged log between the two servers.

In further embodiments, the method may comprise an additional step of determining a level of access for each type of user of the application based on the security log. In this way, the security log may be leveraged in order to determine levels of access for different types of users. For example, an admin should have a high level of access, whereas an external guest should have a low level of access.

Figure 3:
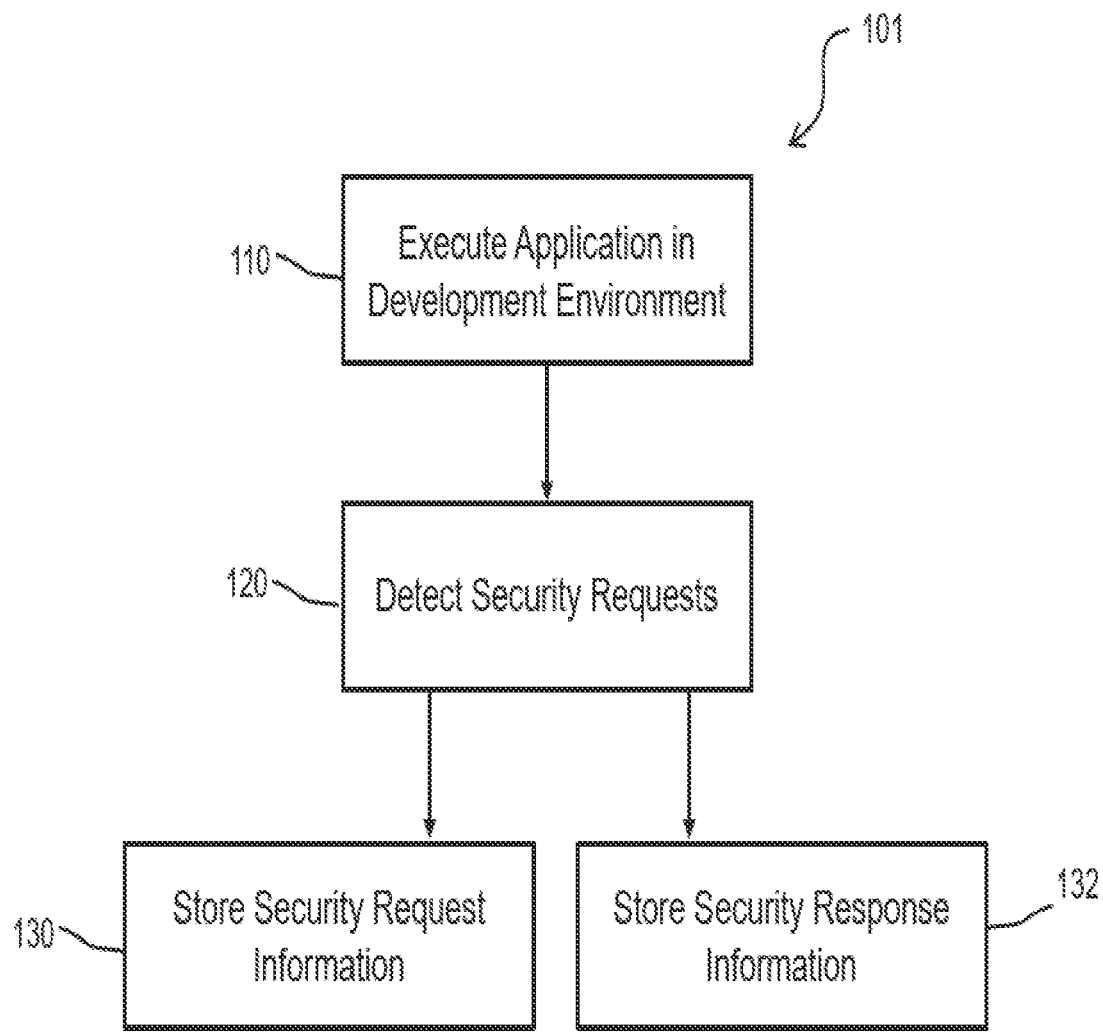
FIG. 3 is a flow diagram of method of acquiring information including security response information according to an alternative exemplary embodiment.

FIG. 3 shows a flow diagram 101 of a method of acquiring information including security response information according to an alternative exemplary embodiment. Steps 110, 120 and 130 of FIG. 3 are equivalent to steps 110, 120 and 130 described in relation to FIG. 2, and therefore further explanation of those steps will be omitted here.

In step 132, security response information corresponding to the detected security requests is stored in the security log. Security response information may be responses made to security requests made on behalf of the application. Similarly to the security request information, security response information may comprise a security response identifier, and one or more of a time stamp, a server identifier, an entry point identifier, and a user identifier.

Due to the acquisition and storage of security response information, more contextual information is provided to the security log regarding the application, and therefore a more accurate security configuration may be determined from the security log.

Figure 4:
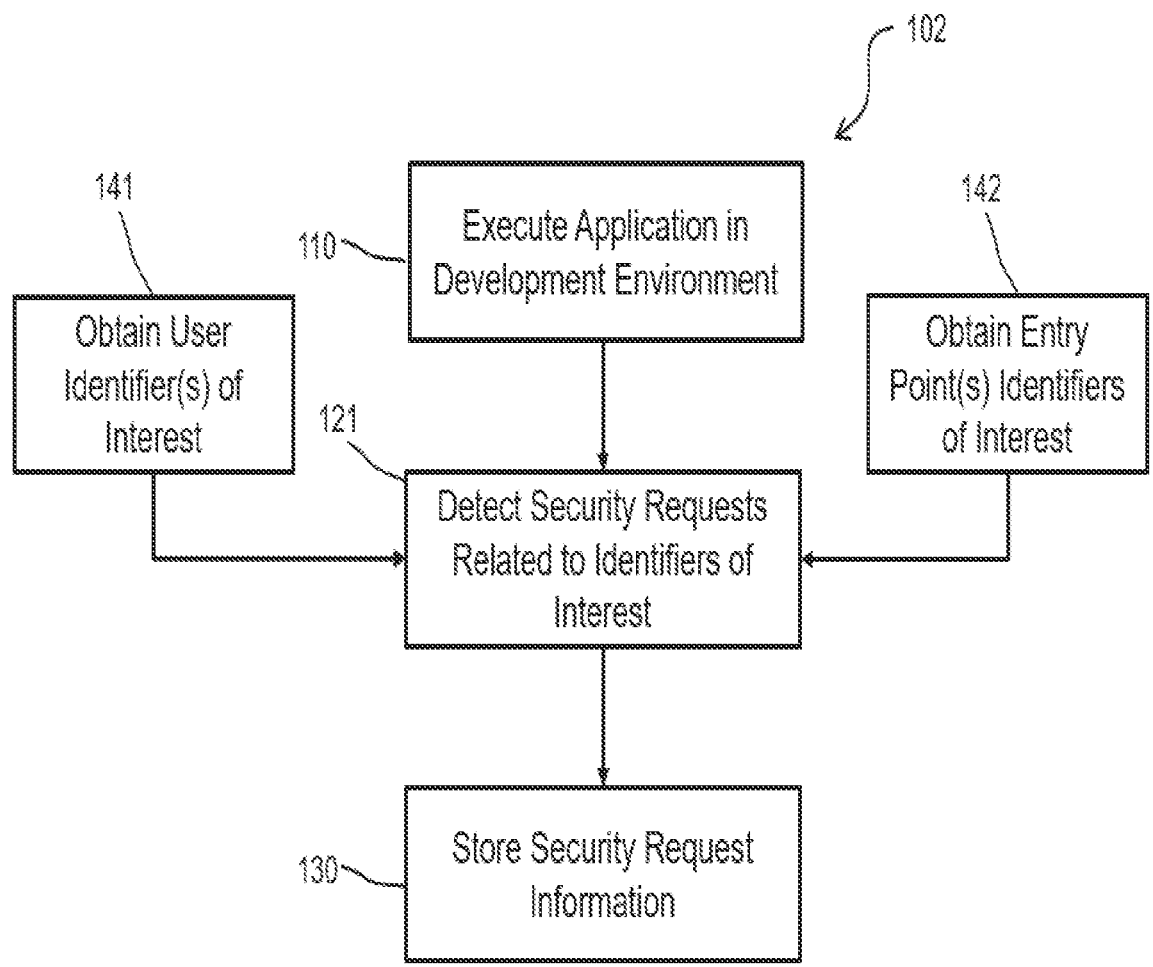
FIG. 4 is a flow diagram of a method of acquiring information regarding a user and/or an entry point of interest according to another exemplary embodiment

Turning now to FIG. 4, there is presented is a flow diagram 102 of a method of acquiring information according to yet another exemplary embodiment, wherein the information is related to a user and/or an entry point of interest. Once again, steps 110, and 130 of FIG. 4 are equivalent to steps 110, and 130 described in relation to FIG. 2, therefore further explanation of those steps will be omitted. It should also be noted that the method described in relation to FIG. 4 may contain step 132 of FIG. 3.

In step 141, one or more user identifiers of interest are obtained. The user identifiers of interest may correspond to individual users of the application, or to different user types of the application. The user identifiers of interest may be entered via an interface, or may be automatically generated.

Accordingly, when step 141 is provided, security requests related to the one or more user identifiers of interest are detected at step 121. In this way, only security request information related to the one or more users of interest may be stored in the security log. This may prove particularly advantageous when a security log is required which focusses upon one or more users, instead of having security request information of all users. Thus, a security configuration determined from the security log may be more quickly and accurately adapted for one or more user types corresponding to the user identifiers of interest.

In step 142, one or more entry point identifiers of interest are obtained. The entry point identifiers of interest may correspond to entry points of the application, or entry points of the server. The entry points of interest may be entered via an interface, or may be automatically generated.

Accordingly, when step 141 is provided, security requests related to the one or more entry points of interest are detected at step 121. In this way, only security request information related to the one or more users of entry points of interest may be stored in the security log. This may prove particularly advantageous when a security log is required which focusses upon one or more entry, instead of having security request information of all users. By way of example, when the entry point identifier corresponds to an entry point of a sensitive database, it may be required to obtain as much security request information as possible about the entry point. Thus, a security configuration determined from the security log may be more quickly and accurately adapted for one or more entry points corresponding to the entry point identifiers of interest.

Moreover, it should be understood that both steps 141 and 142 may be provided. In such a case, only security request information related to user identifiers of interest and at the entry point of interest will be detected and logged. Indeed, only one of steps 141 or 142 may be provided.

Figure 5:
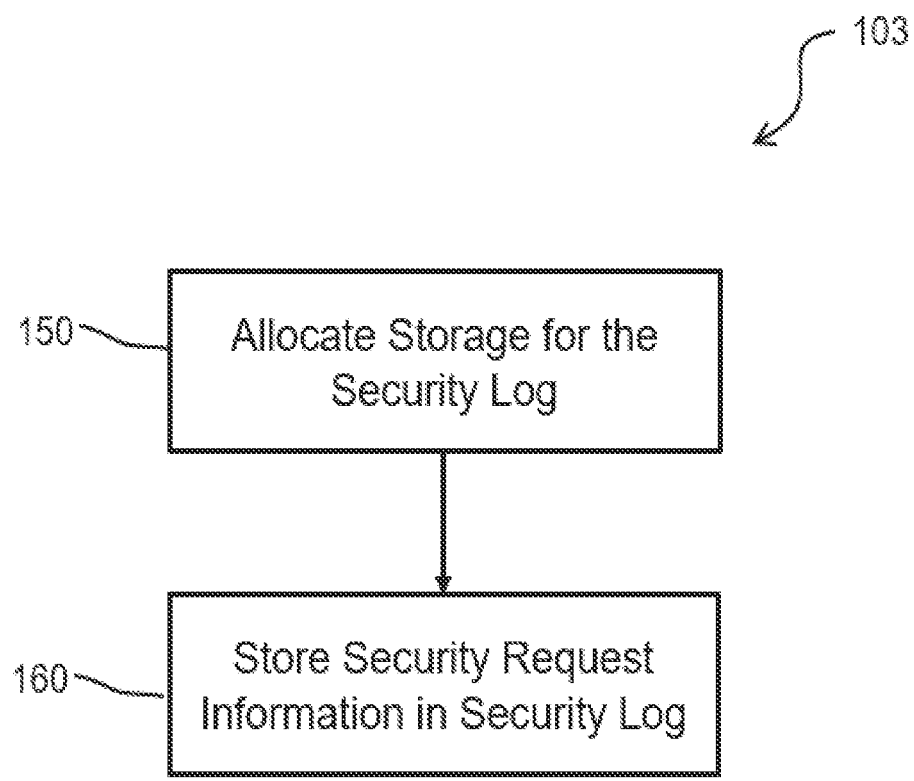
FIG. 5 is a flow diagram of a method of allocating storage for the security log according to an aspect of the invention.

FIG. 5 presents a flow diagram 103 of a method of allocating storage for the security log according to an aspect of the invention.

At step 150, storage for the security log may be allocated. This step may be performed before executing the application in the development environment. In this way, all security request information may be stored, and none may be lost. In the case that the application is run on more than one server, storage may be allocated in each of the one or more servers, or a common storage may be allocated where a compiled security log may be stored.

At step 160, security request information may be stored in the security log. The security request information may be acquired by using any of the methods described above.

Figure 6:
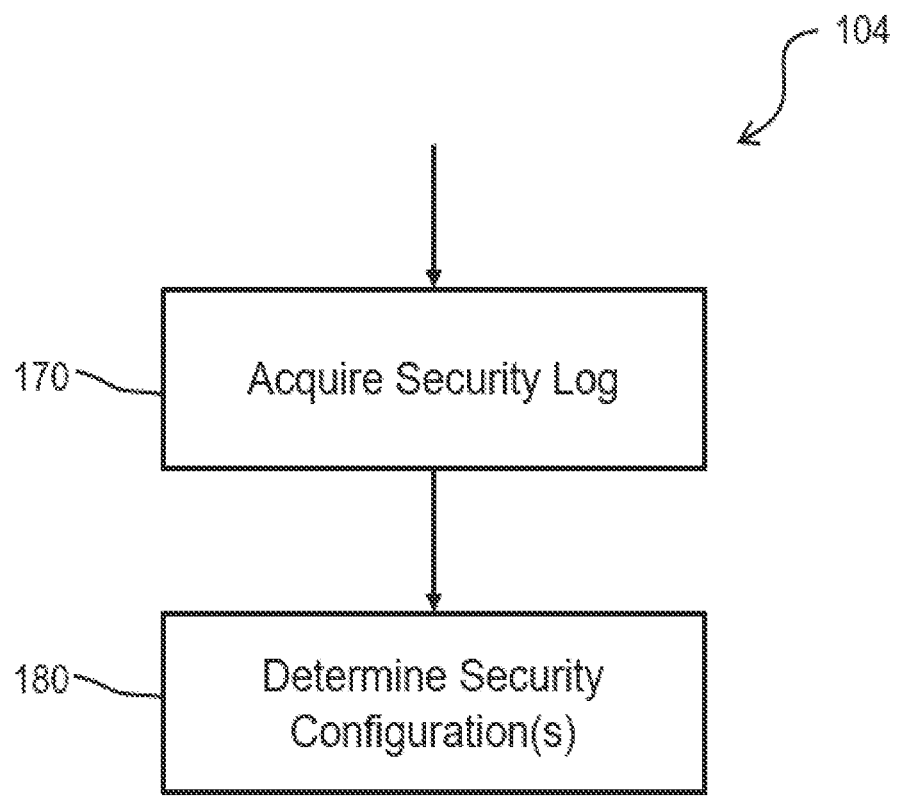
FIG. 6 is a flow diagram depicting the use of the security log to determine security configuration(s) according to another aspect of the invention.

FIG. 6 is a flow diagram 104 depicting the use of the security log to determine security configuration(s) according to another aspect of the invention.

At step 170, a security log corresponding to an application is acquired. The security log may be acquired by any of the exemplary embodiments described above.

At step 180, a security configuration for the application may be determined based on the security request information stored in the security log. This may be performed by outputting the security log in a form in which a security team can determine an appropriate security configuration. Alternatively, the security configuration may be automatically determined using a security configuration algorithm.

In some embodiments, security configurations, for each of a plurality of application environments, may be determined based on the security request information stored in the security log. This may prove particularly advantageous, as the security configuration for each environment may be different. In this case, the plurality of application environments may include a development environment, a test environment, a quality assurance environment, and a production environment. However, the environments are not limited to these, and may be any environment in which the application may be executed.

Figure 7:
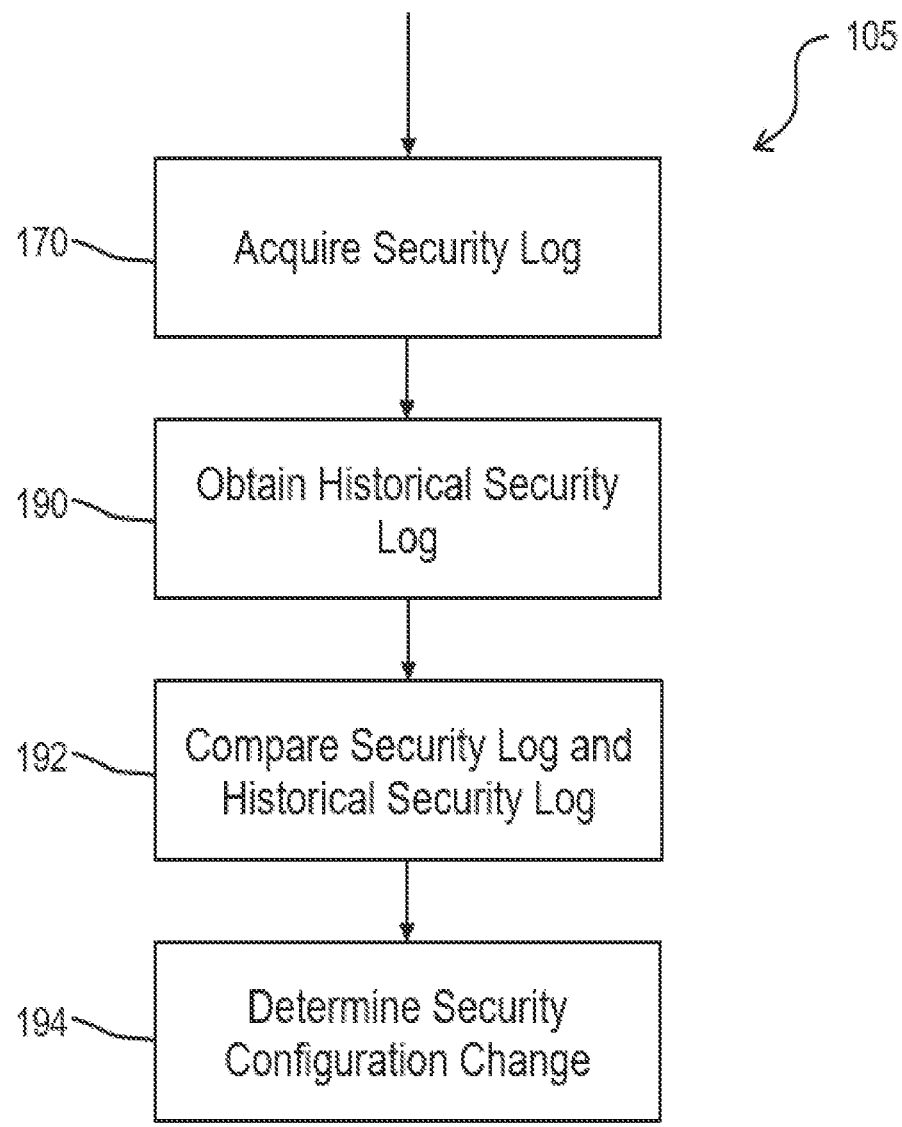
FIG. 7 is a flow diagram of a method of determining a change in the security configuration according to a further aspect of the invention.

Turning to FIG. 7, there is presented a flow diagram 105 of a method of determining a change in the security configuration according to a further aspect of the invention.

At step 170, a security log correspond to an application is acquired. The security log may be acquired by any of the exemplary embodiments described above.

At step 190, a historical security log comprising security request information describing previously detected security requests is obtained. The previously detected security requests may correspond to the application, the application before being updated, or may correspond to a different application.

At step 192, a difference between the security log and the historical security log is determined. This may be achieved by direct comparison between the security log and the historical security log, or may be achieved by negating the historical security log from the security log.

At step 194, a change in the security configuration of the application may be determined based on the determined difference between the security log and the historical security log. Indeed, it is clear that a change in the produced security log compared to a historical security log indicates a need for a change in the security configuration of the application.

Figure 8:
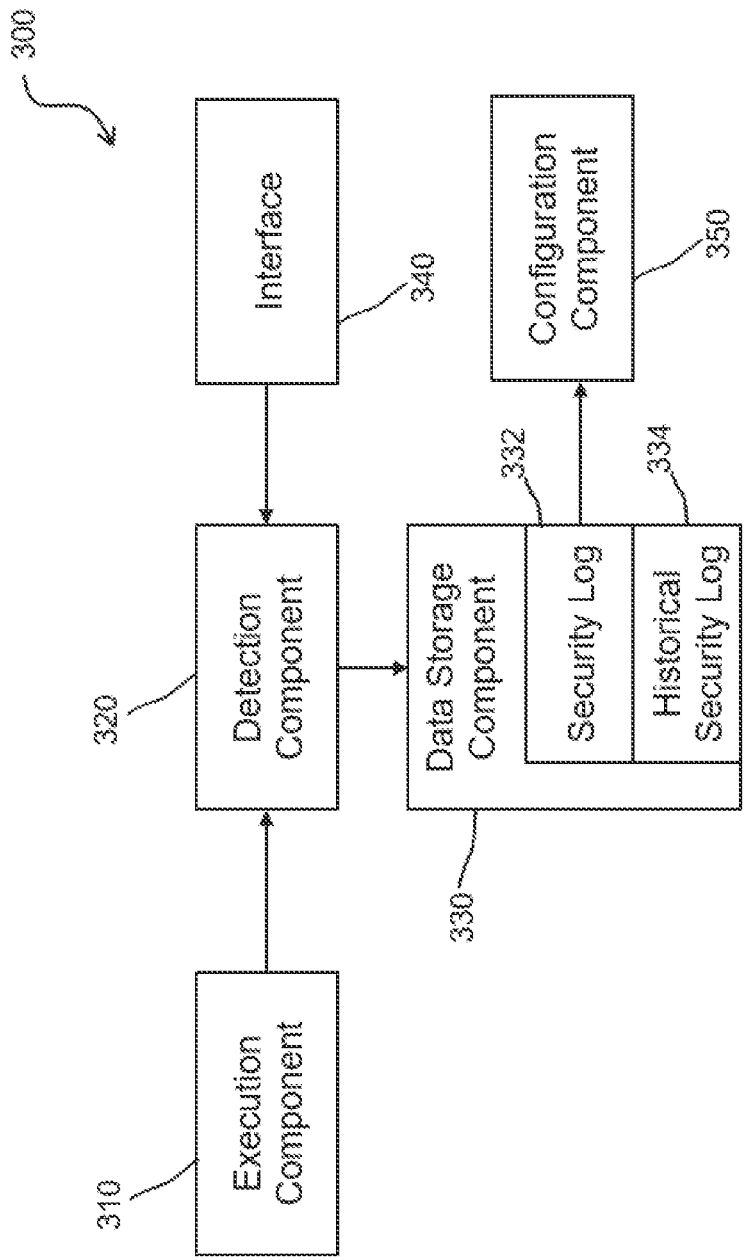
FIG. 8 is a block diagram of an exemplary embodiment of a system for acquiring information for identifying a security configuration for an application.

FIG. 8 is a block diagram 300 of an exemplary embodiment of a system for acquiring information for identifying a security configuration for an application. The system comprises an execution component 310, a detection component 320, and a data storage component 330. In some embodiments, the system may further comprise an interface 340 and/or a configuration component 350.

The execution component 310 is configured to execute an application in a development environment. The execution component 310 may be a server, or more specifically an application server. In some embodiments, the execution component 310 may comprise multiple servers.

The detection component 320 is configured to detect security requests made on behalf of the application. The detection component 320 may be configured to sense and intercept security requests in order to detect all security requests.

The data storage component 330 is configured to store security request information describing the detected security requests in a security log 332. The data storage component 330 therefore contains a security log 332. Memory of the data storage component 330 may be allocated for the security log 332, prior to the execution component executing the application.

In some embodiments, the system 300 may comprise an interface 340 configured to receive one or more user identifiers of interest and/or one or more entry point identifiers of interest. The interface 340 may obtain these directly from a user input, or may obtain this information from memory. In the case that the interface 340 is provided, the detection component 320 is configured to detect security requests corresponding to the user identifier(s) and/or entry point(s) of interest. In this way, the security log 332 of the data storage component 330 may only comprise security request information corresponding to the user identifiers(s) and/or entry point(s) of interest.

In further embodiments, the system 300 may further comprise a configuration component 350. The configuration component 350 may be configured to determine one or more security configurations for the application based on the security log 332.

The data storage component 330 may further contain a historical security log 334 comprising security request information describing previously detected security requests. In this case, the configuration component 350 may be configured to determine a difference between the historical security log 334 and the security log 332, and thus determine a security configuration of the application based on the difference.

Figure 9:
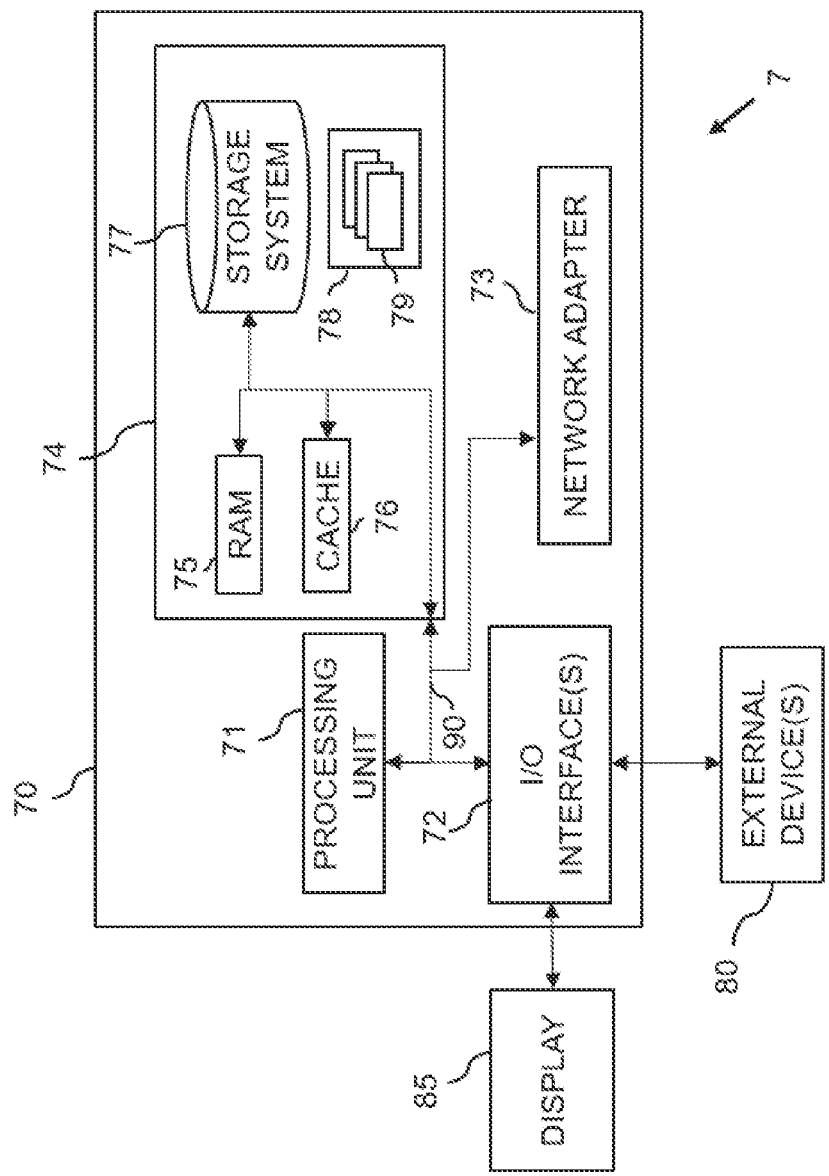
FIG. 9 is a simplified block diagram of a computer system on which the method for acquiring information may be executed.

FIG. 9 is a simplified block diagram of a computer system on which the method for acquiring information may be executed. By way of a further example, as illustrated in FIG. 9, embodiments may comprise a computer system 70, which may form part of a networked system 7. For instance, a system for acquiring information for identifying a security configuration for an application may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having a program executable by the processing unit 71 to cause the system to perform a method for detecting a scene transition in video footage according to a proposed embodiment.

Program/utility 78, having a set (i.e., at least one) of program modules 79, may be stored in memory 74. Program modules 79 generally carry out the functions and/or methodologies of proposed embodiments for detecting a scene transition in video footage.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The mere fact that certain measures are recited in mutually different dependent claims does not indicate that a combination of these measures cannot be used to advantage.

Any reference signs in the claims should not be construed as limiting the scope.

What is claimed is:

1. A computer-implemented method of acquiring information for identifying a security configuration for an application, the method comprising:
    executing an application in a development environment;
    detecting security requests made on behalf of the application;
    storing security request information describing the detected security requests in a security log; and
    determining a security configuration for the application based on the security request information stored in the security log, wherein determining the security configuration for the application comprises:
        determining security configurations for the application based on the security request information stored in the security log for each of a plurality of application environments, wherein the plurality of application environments include a development environment, a test environment, a quality assurance environment, and a production environment.

2. The method of claim 1, wherein the development environment is configured to execute the application with fewer security provisions compared to an operating environment for routine execution of applications.

3. The method of claim 1, wherein the security request information comprises a security request identifier, and one or more of a time stamp, a server identifier, an entry point identifier, and a user identifier.

4. The method of claim 1, wherein the method further comprises storing security response information corresponding to the detected security requests in the security log, wherein the security response information comprises a security response identifier, and one or more of a time stamp, a server identifier, an entry point identifier, or a user identifier.

5. The method of claim 1, wherein the method further comprises:
    obtaining one or more user identifiers of interest; and
    wherein detecting security requests comprises detecting security requests related to the one or more user identifiers of interest.

6. The method of claim 1, wherein the method further comprises:
    obtaining one or more entry point identifiers of interest; and
    wherein detecting security requests comprises detecting security requests related to the one or more entry point identifiers of interest.

7. The method of claim 1, wherein the method further comprises a preceding step of:
    allocating storage for the security log.

8. The method of claim 1, wherein the method further comprises:
    obtaining a historical security log comprising security request information describing previously detected security requests;
    determining a difference between the security log and the historical security log; and
    determining a change in the security configuration of the application based on the determined difference.

9. The method of claim 1, wherein the method further comprises:
    determining a level of access for each type of user of the application based on the security log.

10. The method of claim 1, wherein the application is executed on a first server having a first security log which stores security request information describing detected security requests executed on the first server, and when a security request links to a second server different from the first server, the application is executed on a second server having a second security log which stores security request information describing detected security requests performed on the second server.

11. The method of claim 10, wherein the method further comprises:
    compiling a final security log based on the first security log and the second security log.

12. A computer program product comprising one or more computer-readable storage medium having program instructions stored on at least one of the one or more computer-readable storage medium, the program instructions executable by a processor to implement a method of acquiring information for identifying a security configuration for an application, the method comprising:
    executing an application in a development environment;
    detecting security requests made on behalf of the application;
    storing security request information describing the detected security requests in a security log; and
    determining a security configuration for the application based on the security request information stored in the security log, wherein determining the security configuration for the application comprises:
        determining security configurations for the application based on the security request information stored in the security log for each of a plurality of application environments, wherein the plurality of application environments include a development environment, a test environment, a quality assurance environment, and a production environment.

13. A system for acquiring information for identifying a security configuration for an application, the system comprising:
- an execution component configured to execute an application in a development environment;
- a detection component configured to detect security requests made on behalf of the application;
- a data storage component configured to store security request information describing the detected security requests in a security log; and
- a configuration component configured to determine a security configuration for the application based on the security request information stored in the security log, wherein the configuration component configured to determine the security configuration for the application is further configured to:
  - determine security configurations for the application based on the security request information stored in the security log for each of a plurality of application environments, wherein the plurality of application environments include a development environment, a test environment, a quality assurance environment, and a production environment.

* * * * *